(12) United States Patent
Buslaev et al.

(10) Patent No.: US 11,290,705 B2
(45) Date of Patent: Mar. 29, 2022

(54) RENDERING AUGMENTED REALITY WITH OCCLUSION

(71) Applicant: Mapbox, Inc., San Francisco, CA (US)

(72) Inventors: Aleksandr Buslaev, Minsk (BY); Henadzi Klimuk, Minsk (BY); Roman Kuznetsov, Minsk (BY)

(73) Assignee: Mapbox, Inc., Washington, DC (US)

( * ) Notice: Subject to any disclaimer, the term of this patent is extended or adjusted under 35 U.S.C. 154(b) by 0 days.

(21) Appl. No.: 16/872,181

(22) Filed: May 11, 2020

(65) Prior Publication Data

US 2021/0352262 A1 Nov. 11, 2021

(51) Int. Cl.
| | | |
|---|---|---|
| H04N 13/271 | (2018.01) | |
| G06N 3/08 | (2006.01) | |
| G06T 7/521 | (2017.01) | |
| G06T 7/55 | (2017.01) | |
| G06T 7/80 | (2017.01) | |
| H04N 13/00 | (2018.01) | |

(52) U.S. Cl.
CPC ............. *H04N 13/271* (2018.05); *G06N 3/08* (2013.01); *G06T 7/521* (2017.01); *G06T 7/55* (2017.01); *G06T 7/80* (2017.01); *G06T 2207/20081* (2013.01); *H04N 2013/0081* (2013.01)

(58) Field of Classification Search
CPC .. H04N 13/271; H04N 2013/081; G06T 7/80; G06T 2207/20081; G06N 3/08; G06K 9/00791; G06F 16/587
See application file for complete search history.

(56) References Cited

U.S. PATENT DOCUMENTS

| | | | | |
|---|---|---|---|---|
| 8,663,970 | B1 * | 3/2014 | Huang | ...................... C12P 7/06 435/254.2 |
| 11,024,046 | B2 * | 6/2021 | Venkataraman | .......... G06T 7/55 |
| 2012/0254369 | A1 * | 10/2012 | Gillard | .................... G06T 7/254 709/219 |

(Continued)

FOREIGN PATENT DOCUMENTS

DE     102014119317 A1    6/2016

OTHER PUBLICATIONS

Fraundorfer and Scaramuzza, "Visual Odometry: Part II—Matching, robustness, optimization, and applications," *IEEE Robotics and Automation Magazine*, vol. 12, Issue 2, Feb. 16, 2012, pp. 78-90.

(Continued)

*Primary Examiner* — Oneal R Mistry
*Assistant Examiner* — Nicolas James Boyajian
(74) *Attorney, Agent, or Firm* — Fenwick & West LLP

(57) ABSTRACT

AR elements are occluded in video image frames. A depth map is determined for an image frame of a video received from a video capture device. An AR graphical element for overlaying over the image frame is received. An element distance for AR graphical elements relative to a position of a user of the video capture device (e.g., the geographic position of the video capture device) is also received. Based on the depth map for the image frame, a pixel distance is determined for each pixel in the image frame. The pixel distances of the pixels in the image frame are compared to the element distance, and in response to a pixel distance for a given pixel being less than the element distance, the pixel of the image frame is displayed rather than a corresponding pixel of the AR graphical element.

20 Claims, 11 Drawing Sheets

(56) References Cited

U.S. PATENT DOCUMENTS

| | | | |
|---|---|---|---|
| 2013/0328867 A1 | 12/2013 | Jung et al. | |
| 2016/0073080 A1* | 3/2016 | Wagner | G06T 5/50 348/47 |
| 2016/0350930 A1* | 12/2016 | Lin | G06K 9/66 |
| 2020/0041276 A1* | 2/2020 | Chakravarty | G01C 21/32 |
| 2020/0082561 A1 | 3/2020 | Karonchyk et al. | |
| 2020/0082565 A1 | 3/2020 | Klimoich et al. | |

OTHER PUBLICATIONS

Godard, C. et al., "Digging Into Self-Supervised Monocular Depth Estimation," Aug. 17, 2019, obtained online https://arxiv.org/pdf/1806.01260.pdf.

Scaramuzza and Fraundorfer, "Visual Odometry: Part 1—The First 30 Years and Fundamentals," *IEEE Robotics and Automation Magazine*, vol. 18, Issue 4, Dec. 8, 2011, pp. 80-92.

Scaramuxxa, D., Tutorial on Visual Odometry, Robotics and Perception Group, University of Zurich, http://rpg.ifi.uzh.ch/visual_odometry_tutorial.html, 2014.

Kumar, A. CS. et al. "DepthNet: A Recurrent Neural Network Architecture for Monocular Depth Prediction." Proceedings of the IEEE Conference on Computer Vision and Pattern Recognition (CVPR) Workshops, Salt Lake City, Jun. 18-22, 2018, pp. 396-404.

Mancini, M. et al. "Fast Robust Monocular Depth Estimation for Obstacle Detection with Fully Convolutional Networks." 2016 IEEE/RSJ International Conference on Intelligent Robots and Systems (IROS), Daejeon, Korea, Oct. 9-14, 2016, pp. 4296-4303.

The German Patent and Trademark Office, Office Action, German Patent Application No. 102021204765.3, dated Dec. 16, 2021, nine pages, (with concise explanation of relevance).

Zhang, C. et al. "Semantic Segmentation of Urban Scenes Using Dense Depth Maps." European Conference on Computer Vision, ECCV 2010, Sep. 5-11, 2010, pp. 708-721.

\* cited by examiner

RENDERING AUGMENTED REALITY WITH OCCLUSION

BACKGROUND

This disclosure generally relates to displaying augmented reality elements.

When a video capture device, e.g., a video camera on a smartphone, captures video of a scene for use in displaying augmented reality (AR) or mixed reality, AR elements may typically be displayed covering or overlapping the scene. In certain applications, it is desirable to render and display AR elements to appear occluded (concealed behind) or partially occluded by a portion of the scene in the video. For example, in a navigation system that displays an AR view of the scene in front of a vehicle, it may be confusing for a user if an AR element appears in front of objects that are closer than a corresponding distance of the AR element.

For cases where live video footage (e.g., for navigation system), or a relatively contemporaneous video footage, is displayed with AR element, the AR elements must be correctly rendered and/or displayed quickly with little delay. It is challenging to quickly and efficiently determine whether an AR element should appear occluded by portions of a scene in a video when rendering and/or displaying the AR elements.

SUMMARY

In order to occlude AR elements, as displayed in images, a depth map is employed to determine the distance to pixels representing elements of the real world, and the pixel distances are compared with distances of AR elements to determine where in an image occlusion should occur. A depth map is determined for an image frame of a video received from a video capture device. An AR graphical element for overlaying over the image frame is received. An element distance for AR graphical elements relative to a position of a user of the video capture device (e.g., the geographic position of the video capture device) is also received. Based on the depth map for the image frame, a pixel distance is determined for each pixel in the image frame. The pixel distances of the pixels in the image frame are compared to the element distance. In response to a pixel distance for a given pixel being less than the element distance, the given pixel of the image frame is displayed rather than a corresponding pixel of the AR graphical element. Conversely, responsive to the pixel distance for a given pixel being greater than the element distance, a corresponding pixel of the AR graphical element is displayed. The image frames overlaid with AR graphical content may be displayed as a live video feed on a client device of the user (e.g., a mobile computing device). The video capture device may be associated with a mobile computing device (e.g., the video capture device may be a camera integrated into a smartphone). The video capture device may also be associated with a vehicle (e.g., integrated into the vehicle dashboard). In some embodiments, the received geographic location of the video capture device is specified relative to a geographic location of the vehicle.

In some embodiments, the depth map for the image frame is determined using a depth estimation model. The depth estimation model may take the image frame as input and output a depth map as output including a relative depth value (e.g., 0 to 1) for each pixel in the image frame. The depth estimation model may be a self-supervised monocular depth estimation model.

In some embodiments, the pixel distances for pixels in the image frame are determined using a reference distance to a portion of the scene in the image frame. The reference distance may be used to determine a conversion factor from depth values in the depth map to pixel distances. The reference distance may be determined based on the geographic location of the video capture device and the angular orientation of the geographic device.

The figures depict embodiments of the present disclosure for purposes of illustration only. One skilled in the art will readily recognize from the following description that alternative embodiments of the structures and methods illustrated herein may be employed without departing from the principles or benefits of the disclosure described herein.

DETAILED DESCRIPTION

System Overview

Figure 1:
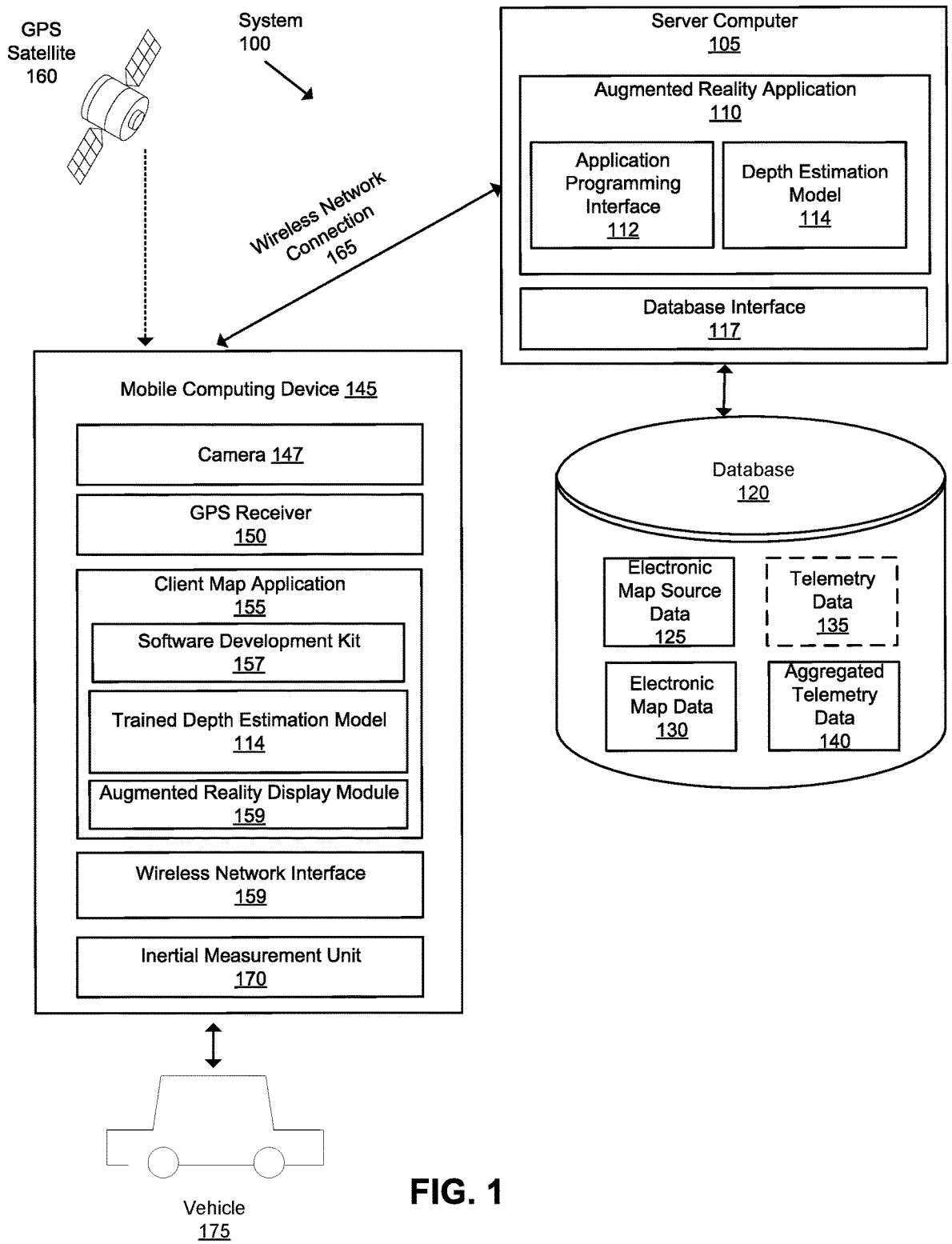
FIG. 1 is a block diagram of a system environment, in accordance with some embodiments.

FIG. 1 is a block diagram of a system environment, in accordance with some embodiments. FIG. 1 illustrates an example computer system in which the techniques described may be practiced, in accordance with some embodiments.

A computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. In other embodiments, other geolocation systems could be employed. The server computer 105 comprises an augmented reality (AR) application 110, an application programming interface (API) 112, a depth estimation model 114, and a database interface 117. The database 120 comprises electronic map source data 125, electronic map data 130, telemetry data 135, and aggregated telemetry data 140. The mobile computing device 145 comprises a camera 147, a GPS receiver 150, a client map application 155, a wireless network interface 159, and an inertial measurement unit 170. The client map application 155 includes the trained depth estimation model 114, a software development kit (SDK) 157, and an AR display module 159. The client map application 155 is hosted by the mobile computing device 145, and runs the trained depth estimation model 114. The client map application 155 and/or the AR application 110 use the output of the trained depth estimation model 114 in a number of ways, as discussed in the following sections. The client map application 155 may receive the trained depth estimation model 114 from the AR application 110 on the server computer 105.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute augmented reality application 110, and may include other applications, software, and other executable instructions, such as database interface 117, to facilitate various aspects of embodiments described herein.

Database interface 117 is a programmatic interface such as JDBC or ODBC for communicating with database 120. Database interface 117 may communicate with any number of databases and any type of database, in any format. Database interface 117 may be a piece of custom software created by an entity associated with the augmented reality application 110, or may be created by a third-party entity in part or in whole.

Database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

Electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

Electronic map data 130 is digital map data that is provided, either directly or indirectly, to client map applications, such as client map application 155, e.g., using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

Telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

Aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

Mobile computing device 145 is any mobile computing device, such as a laptop computer, hand-held computer, wearable computer, cellular or mobile phone, portable digital assistant (PDA), or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS receiver 150. GPS receiver 150 is a receiver used by mobile computing device 145 to receive signals from GPS satellite 160, which broadly represents three or more satellites from which the mobile computing device may receive signals for resolution into a latitude-longitude position via triangulation calculations. In other embodiments, geolocation capability may be provided by technologies other than GPS.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use WiFi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device.

Mobile computing device 145 also includes a camera device 147, also referred to herein as a "video capture device." The camera 147 may be external, but connected to the mobile computing device 145, such as a camera built into a vehicle that transmits data locally to the mobile computing device. Alternatively, the camera 147 may be an integrated component of the mobile computing device 145. Camera 147 functionality may include the capturing of infrared and visible light. In some embodiments, the camera 147 is coupled to a vehicle, such as a car.

Mobile computing device 145 may include a client map application 155 which is software that displays, uses, supports, or otherwise provides electronic mapping functionality as part of the application or software. The client map application 155 also displays AR video content with AR and/or mixed reality graphical elements overlaid on the video, according to some embodiments. The AR video content may be provided in the context of electronic mapping functions, such as turn-by-turn navigation. Client map application 155 may be any type of application that uses map data, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In the server computer 105, the AR application 110 provides the API 112 that may be accessed, for example, by client map application 155 using SDK 157 to provide electronic mapping to client map application 155. Specifically, the AR application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, receiving electronic map source data 125 from data providers, processing electronic map source data 125 to generate electronic map data 130, sending AR graphical elements for display to mobile computing devices, sending electronic map data 130 associated with AR graphical elements, and any other aspects of embodiments described herein.

The AR application 110 also includes the depth estimation model 114. The depth estimation model 114 receives video data from the camera 147. In one embodiment, the client map application 155 may also receive processed image frames of the video data from the depth estimation model 114. In some embodiments, the depth estimation model 114 is configured to generate a depth map corresponding to an image frame of a video provided as an input to the depth estimation model 114. In some embodiments, as shown in FIG. 1, the mobile computing device 145 includes a trained local copy of the depth estimation model 114 received from the server computer 105. The client map application 155 may input image frames of a video captured by the camera 147 to the trained depth estimation model 114 and retrieve the corresponding output depth maps for displaying AR graphical elements overlaid on the video. The depth estimation model 114 may be trained using image frames from one or more videos (i.e., training image frames). The training image frames may be received by the augmented reality application 110 from other devices or systems (e.g., from the mobile computing device 145 or a remote data store). Techniques for training the depth estimation model 114 are discussed in greater detail below with regard to FIG. 7.

The AR display module 159 displays video from the camera 147 with the AR graphical elements displayed overlaid on the video (also referred to herein as "AR video"). The AR video may be displayed as part of a mapping service. For example, the AR video may be displayed to provide context to a user for a location on a map. In other embodiments, the AR video is provided as part of a turn-by-turn navigation service and/or system. The AR graphical elements may provide contextual instructions for navigating an environment depicted in the AR video. For example, a turn symbol or indicator may be displayed to appear at a specific point in the environment to indicate to a user a location where the user should turn in order to navigate to a desired destination. The AR display module 159 displays the AR graphical elements with occlusion by objects and/or elements in the scene depicted by the AR video. The occlusion includes displaying portions of the scene to appear in front of the AR graphical elements, such that the AR graphical element is at least partially occluded by the objects and/or elements in the scene. Displaying the AR video with occlusion of the AR graphical elements provides richer contextual information for the user and accurate placement of the AR graphical element in the scene, as discussed in further detail below with regard to FIGS. 5A and 5B.

According to one embodiment, the techniques described herein are implemented by one or more special-purpose computing devices. For example, the server computer 105 and the mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
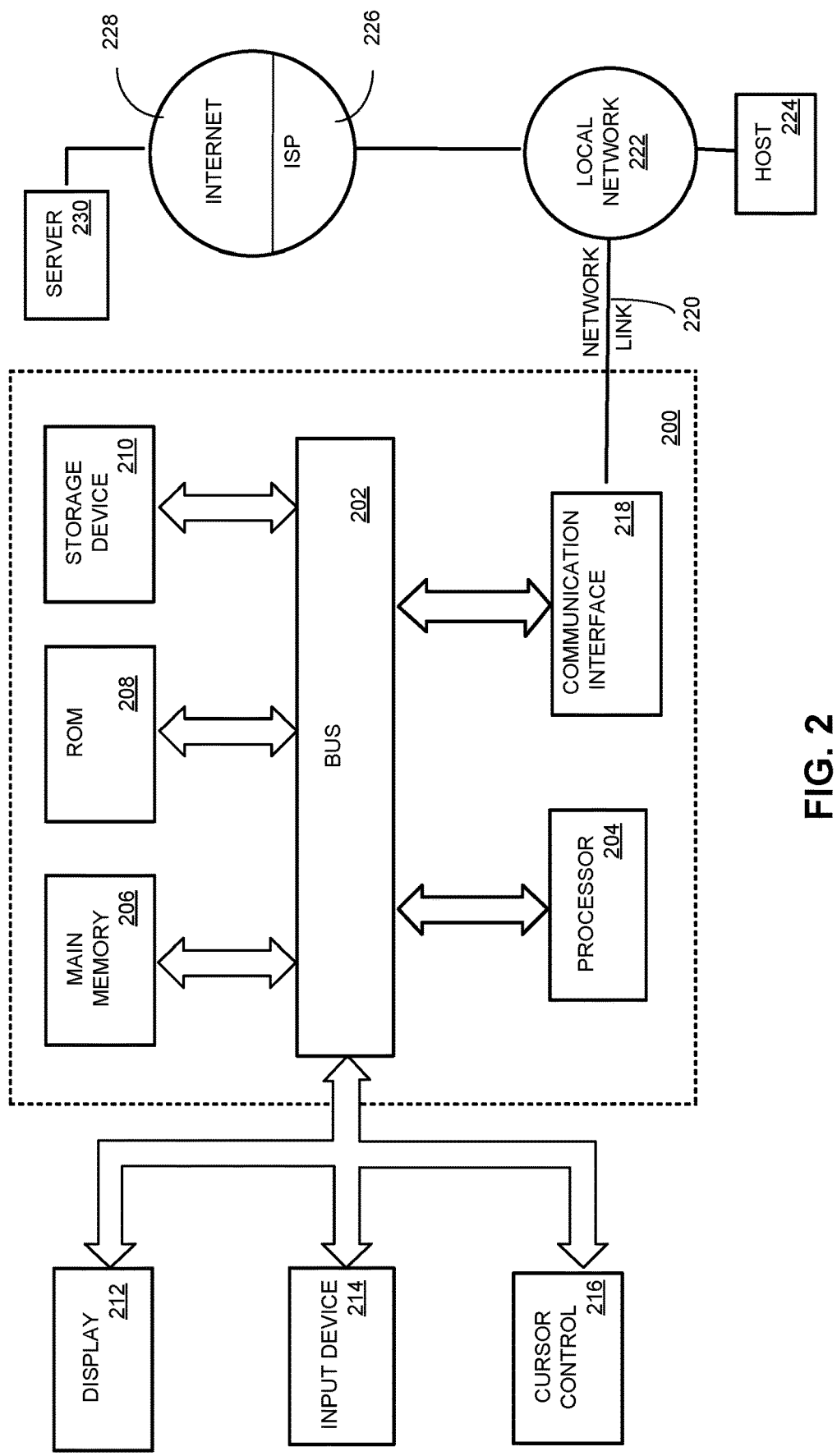
FIG. 2 is an example of a computing device, in accordance with some embodiments.

FIG. 2 is an example of a computing device, in accordance with some embodiments. The computing device 200 may be used as part of the mobile computing device 145, the server computer 105, other components of the system 100, or some combination thereof. Computing device 200 includes a bus 202 or other communication mechanism for communicating information, and a hardware processor 204 coupled with bus 202 for processing information. Hardware processor 204 may be, for example, a general purpose microprocessor.

Computing device 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computing device 200 into a special-purpose machine that is customized to perform the operations specified in the instructions.

Computing device 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computing device 200 may be coupled via bus 202 to a display 212, such as a cathode ray tube (CRT), LCD screen, LED screen, or touch screen, for displaying information to a computer user. An input device 214, which may include alphanumeric and other keys, buttons, a mouse, a touchscreen, or other input elements, is coupled to bus 202 for communicating information and command selections to processor 204. In some embodiments, the computing device 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computing device 200 may implement the techniques described herein using customized hard-wired logic, one or more ASICs or FPGAs, firmware and/or program logic which in combination with the computer system causes or programs computing device 200 to be a special-purpose machine. According to one embodiment, the techniques herein are performed by computing device 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computing device 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computing device 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computing device 200, are example forms of transmission media.

Computing device 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

AR Display Module

Figure 3:
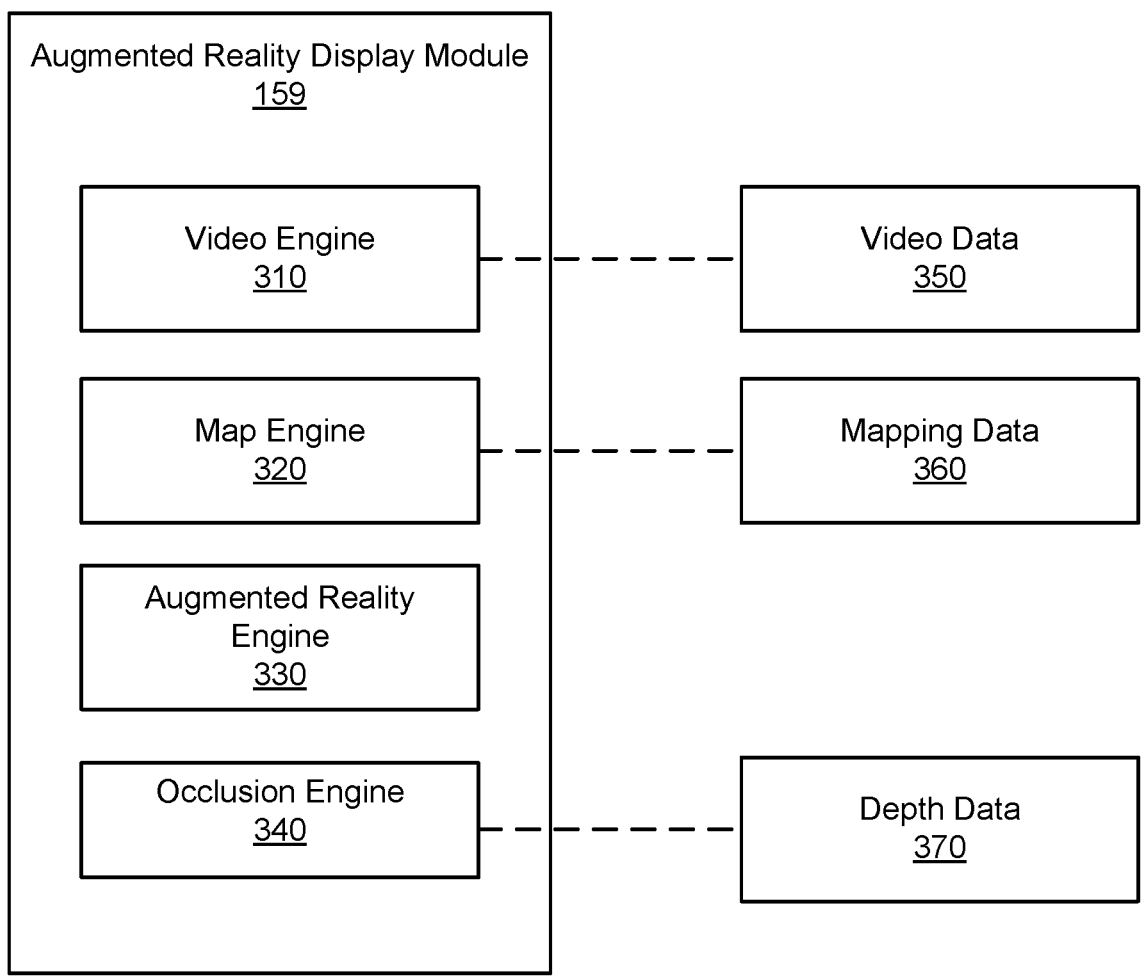
FIG. 3 is a block diagram illustrating an AR display module, in accordance with some embodiments.

FIG. 3 is a block diagram illustrating an AR display module 159 from FIG. 1, in accordance with some embodiments. The AR display module 159 includes a video engine 310, a map engine 320, an AR Engine 330, and an occlusion engine 340. The video engine 310 receives video data 350, such as video captured by the camera 147. The video includes a plurality of image frames, each image frame depicting a local environment of the camera. Each image frame is a two-dimensional image with a predefined size. For example, each image frame of the video may have dimensions of 1,920 pixels by 1,080 pixels. Each pixel of an image frame may have corresponding pixel coordinates indicating a row and a column of the image frame where the pixel is located, according to some embodiments.

The video data 350 received by the video engine 310 may also include metadata for the video, such as intrinsic parameters of the camera 147 (e.g., a focal length, an optimal center, and a skew coefficient), an angular orientation of the camera 147, a date and time corresponding to a time of capture, an acceleration of the camera 147 during the capture of the video or other relevant metadata. In some embodiments, the metadata for the video includes GPS data for the camera 147, and the GPS data may be provided to the map engine 320.

The video engine 310 may include components for processing and/or manipulating the received video data 350. For example, the video engine 310 may condition the image quality or properties of the image frames in the video (e.g. brightness, contrast, resolution, or other properties). The video engine 310 provides the processed video content to the AR engine 330 for displaying AR video to a user. In some embodiments, the video engine 310 also provides the corresponding metadata to the AR engine 330.

In some embodiments, the video engine 310 detects objects depicted in the received video and corresponding locations of the detected objects relative to the image frame the objects appear in. In further embodiments, the video engine 310 may use a trained machine learning model (not shown) to detect the objects in the received video. In this case, the image frames of the video are inputted to the machine learning model (also referred to herein as the "object detection model"), which outputs the detected object and the corresponding location of the detected object for each image frame the object appears in. The video engine 310 may also determine other information about the object. For example, the video detection engine 310 may determine the type of object, a size of the object, a color of the object, or some combination thereof. The video engine 310 may provide the outputs of the object detection model to the AR engine 330 and the occlusion engine 340 for determining the manner in which to display the AR graphical elements with occlusion.

In some embodiments, the video engine 310 segments portions of each image frame of the video. The video engine 310 may include a trained machine learning model (not shown) that is used to segment portions of each image frame of the video. In this case, the video engine 310 inputs image frames to the machine learning model (also referred to herein as the "segmentation model"), which outputs groups of pixels and corresponding labels for each group of pixels. Each output group of pixels may be segmented by a category. For example, an output group of pixels comprising a portion of an image frame may be categorized by a type of object with an output label that includes data relevant to the type of object. In other examples, an output group of pixels is segmented to indicate the portion of the image frame that includes a ground surface. The segmentation model is discussed in further detail below with regard to FIG. 9. The video engine may provide the outputs of the segmentation model to the AR engine 330 and the occlusion engine 340 for determining the manner in which to display the AR graphical elements with occlusion.

The map engine 320 identifies mapping data relevant to the display of augmented reality content. In particular, the map engine 320 receives mapping data 360 from the electronic map data 130. According to some embodiments, the mapping data 360 includes a map tile including map data corresponding to geographic coordinates. The geographic coordinates may include at least coordinates that correspond to geographic locations in the vicinity of the mobile computing device 145. The map engine 320 may also receive mapping data 360 that is relevant to AR graphical elements. For example, the map engine 320 may receive geographic locations that indicate where the AR graphical elements should appear in the displayed AR video relative to a location of the mobile computing device 145.

The mapping data 360 also includes geographic coordinates indicating the geographic location of the camera 147 at the time a received video is captured by the camera 147. This may be included as GPS data at the time the video was captured. The GPS data may be generated by using the GPS receiver 150 of the mobile computing device 145. In some cases, the geographic location of the camera 147 is the same as that of the mobile computing device 145, but in other cases, the camera 147 may not be local to (e.g., part of, connected to) the mobile computing device 145. In other embodiments, the geographic coordinates of the camera 147 are provided from another source, for example from the database 120. The geographic coordinates of the camera 147 may also include timestamps to indicate a time at which the camera 147 was at the location indicated by the geographic coordinates. In some embodiments, each geographic coordinate is associated with an image frame of a video based on the timestamp.

In some embodiments, the GPS data indicates the geographic location of a vehicle associated with the camera 147. In this case, the location of the camera 147 may be approximated by the location of the vehicle. In other embodiments, the position of the camera 147 relative to the vehicle may be received by the map module 320.

The geographic coordinates may be in the form of geographic latitude and longitude coordinates for the camera 147. Alternatively, the geographic coordinates may be in the form of local East, North, Up (ENU) coordinates of the camera 147, in a local tangent plane corresponding to the vicinity of the camera 147. In some embodiments, both the geographic latitude and longitude of the camera 147 and the local ENU coordinates of the camera 147 are received by the map module 320.

The AR engine 330 is configured to generate the AR video that is displayed to the user. The AR video is provided to a display of the mobile computing device 145 according to some embodiments. In other embodiments, the AR video is transmitted via the wireless network connection 165 to the AR application 110 on the server computer 105. The server computer 105 may then transmit or broadcast the AR video to other client devices. The AR engine 330 may generate AR video for various purposes relevant to the client map application 155, such as positing navigation instructions along a road, annotating objects in the real world, or positioning and/or animating AR game content.

The AR engine 330 receives video from the video engine 310 and mapping data from the map engine 320 that is relevant to the video data. In other embodiments, the AR engine 330 receives the video data 350 and the mapping data 360 directly from the camera 147 and the electronic map data 130, respectively. The AR engine 330 generates AR graphical elements to be displayed overlaid on the video, resulting in the AR video. The AR engine 330 may further determine (or receive from another component of the mobile computing device 145) a world position of the AR graphical elements, such as a position relative to the mobile computing device 145. For example, if the AR graphical element is a chevron indicating a direction for a user of the mobile computing device 145 to turn on a road, the world position of the AR graphical element may be 5 meters from the computing device 145 towards the road. Alternatively, the world position of the chevron may be located directly above the road, e.g., as determined using a GPS position of the road including in the mapping data 360.

For each AR graphical element, the AR engine 330 determines which image frames of the video the AR graphical element appears in and an AR position in the corresponding image frames of the video where the AR graphical element appears (e.g., the pixel position an AR graphical element appears at in an image frame). The AR engine 330 may determine the AR position for an AR graphical element by projecting the world position of the AR graphical element to a position on the image frame using the geographic location and angular orientation of the camera 147 at the time the image frame is captured. Furthermore, the AR engine 330 may use the AR position to determine whether, and how, the AR graphical element appears overall in the image. According to further embodiments, the AR engine 330 determines how the graphical AR graphical element appears based also on an acceleration of the camera 147 or based on other relevant metadata. The AR engine 330 generates an AR position in the corresponding image frames for each AR graphical element. The AR position includes a horizontal coordinate, a vertical coordinate, and a distance coordinate. The horizontal coordinate and vertical coordinate may be in units of pixels, according to some embodiments. The distance coordinate may be in units of distance (e.g., meters), according to some embodiments. In other embodiments, the distance coordinates may be in a depth unit that is normalized to the focal length of the camera, or some other distance. The distance coordinate may be used to scale the size of the AR graphical element in order to provide an accurate sense of depth and motion to a user. The AR engine 330 provides the AR position of the AR graphical elements to the occlusion engine 340.

The occlusion engine 340 determines which portions of the video are displayed as occluding the relevant AR graphical elements. The occlusion engine 340 receives the video from the video engine 310 and the AR position of the AR graphical elements. The occlusion engine 340 retrieves depth data 370 from the trained depth estimation model 114. The depth data 370 is generated by the trained depth estimation model 114 in response to inputting an image frame of the video to the trained depth estimation model 114. The depth data 370 includes a depth map for each image frame of the video. Each depth map includes a relative depth value for each pixel of the image frame. According to some embodiments, the depth values are in units of normalized depth.

In order to determine whether to display a pixel of the image frame occluding a portion of an AR graphical element, the occlusion engine 340 converts each depth value to a distance with the same units as the distance coordinates of the AR positions of the AR graphical elements. The depth value may be converted to the appropriate units using various methods, according to different embodiments. In some embodiments, a reference distance corresponding to a reference pixel is determined. The reference distance indicates a distance from a reference element represented by the reference pixel to the camera 147. The reference element may be, for example, an object, a landmark, a physical feature, a point in space, or some other element that has a finite distance from the camera 147. A conversion factor is calculated by dividing the reference distance by the depth value corresponding to the reference pixel. Each depth value may be converted to a distance by multiplying the depth value by the conversion factor. According to further embodiments, multiple conversion factors corresponding to different reference pixels may be calculated, and an average conversion factor may be determined by averaging the conversion factors. The average conversion factor may then be used for converting the depth values to distance. In other embodiments, other statistical analysis techniques may be used to determine a practical conversion factor.

According to some embodiments, the reference distance may be calculated using a calibration method. The calibration method includes determining the reference distance based on an angular orientation of the camera 147 relative to a ground plane corresponding to the location of the camera 147 at the time of the capture of the image frame. Methods for determining the reference distance using a calibration method are described in co-pending U.S. patent application Ser. No. 16/566,831, entitled "Calibration for Vision in Navigation Systems," filed on Sep. 10, 2019, which is incorporated by reference in its entirety.

In other embodiments, the reference distance may be calculated using object detections of a static object in multiple images captured from different positions. For example, the camera 147 may capture images frames of a static object (e.g., a stop sign) as the vehicle 175 moves through an environment. The static object may be detected in each of the image frames in which it appears (e.g., using an object detection model) and the image frames may be used to determine the detected object's position relative to the camera 147 when capturing each of the image frames. The detected object's position may then be used to determine the reference distance for each of the image frames in which the detected object appears. Determining the position of a detected object relative to an imaging device is described in co-pending U.S. patent application Ser. No. 16/564,701, entitled "Mapping Objects Detected in Images to Geographic Positions," filed Sep. 9, 2019, which is incorporated by reference in its entirety.

In other embodiments, reference elements are detected in the image frames and the geographic locations of the elements are used to determine the reference distance. The reference elements may be detected using segmentation (e.g., using the trained segmentation model), according to some embodiments. In other embodiments, a dynamic object detection system may be used to detect and identify reference elements. For example, an advanced driver-assistance system (ADAS) may identify a reference element (e.g., a vehicle) in an image frame and select corresponding pixels as reference pixels. The occlusion engine 340 may then retrieve geographic locations of the detected reference element from the mapping engine 330 and calculate a distance based on the geographic locations of the camera 147 and the detected reference element. The geographic locations of the reference elements may be accessed from the database 120. For example, if the reference element is a vehicle, an ADAS may detect and identify the vehicle in the image frame and access a database storing the up-to-date geographic location of the identified vehicle. Alternatively, the ADAS may detect the distance from the camera 147 to the vehicle using other methods.

The occlusion engine may determine the reference distance for the reference pixels using other methods than described above, according to some embodiments. The AR display module 159 may include other configurations and functions not described above, according to some embodiments.

AR Video with Occlusion

Figure 4:
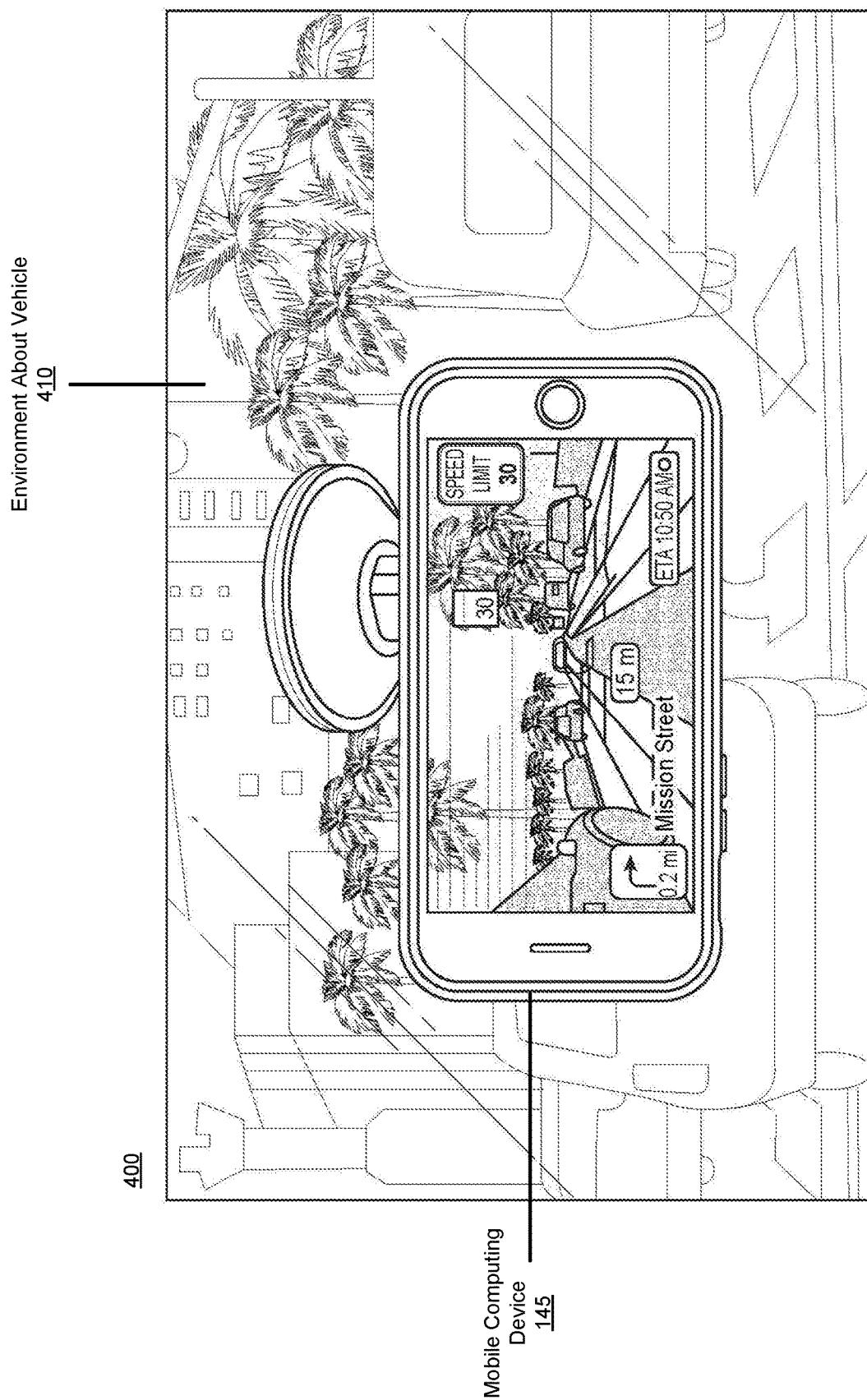
FIG. 4 illustrates an example of a video capture device capturing an environment about a vehicle, in accordance with some embodiments.

FIG. 4 illustrates an example of a video capture device capturing an environment about a vehicle, in accordance with some embodiments. In the example view 400, the mobile computing device 145 is a smartphone shown mounted onto the windshield of a car. The camera 147 (not shown in FIG. 4) is integrated with the mobile computing device 145 and captures a view of the environment about the vehicle 410. The orientation of the camera 147 may not be parallel to the ground plane at the location of the mobile computing device 145. For example, the mobile computing device and the camera 147 may be tilted downwards or upwards relative to the ground plane. In the example view 400, the mobile computing device 145 is displaying the image frames depicting the environment 410 being captured by the camera 147 in real-time, with graphical overlays. In alternative embodiments, the mobile computing device 145 displays pre-recorded image frames. While the mobile computing device 145 with the camera 147 is coupled to the windshield of the vehicle, the camera 147 may be coupled in different manner to an associated vehicle. In other embodiments, the camera 147 is not associated with a vehicle.

Figure 5A:
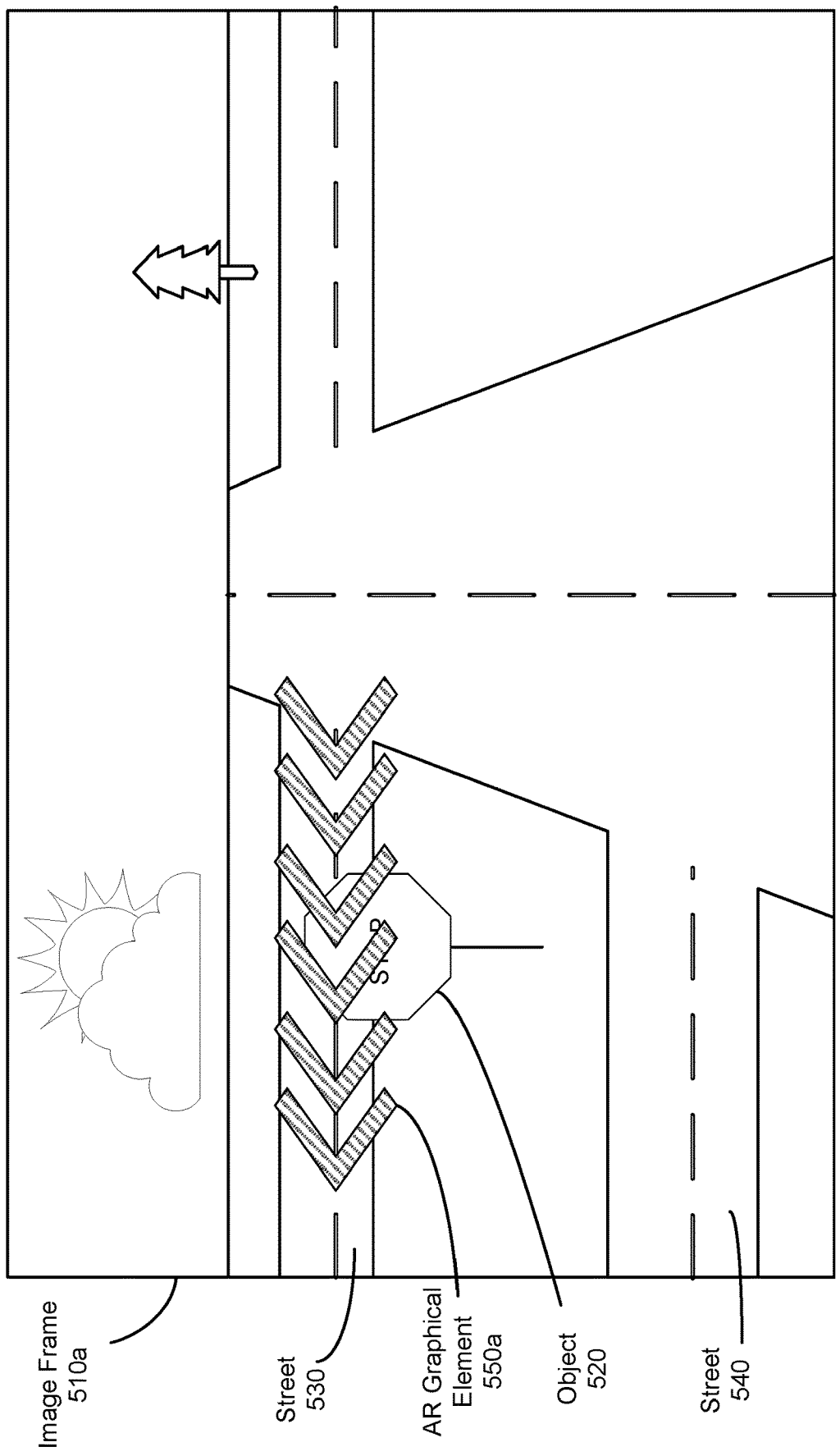
FIG. 5A illustrates an example of a scene depicted in an image frame of a video and a corresponding augmented reality (AR) graphical element overlaid on the scene without occlusion, in accordance with some embodiments.

FIG. 5A illustrates an example of a scene depicted in an image frame of a video and a corresponding augmented reality (AR) graphical element as they would be overlaid on the scene without occlusion. The image frame 510a is an example of an image frame of an AR video without occlusion and depicts a scene including an object 520, a street 530, and a street 540. In this example, the object 520 is a stop sign that is captured by a camera that is mounted to a windshield of a vehicle 530 (e.g., a car), similarly to the mobile computing device 145 shown in FIG. 4. In this example, the image frame 510a is part of an AR video displayed to a user for turn-by-turn navigation. An AR graphical element 550a is displayed overlaid on the image frame without occlusion. The AR graphical element 550a is intended to indicate that the user should turn left on the street 530. While the AR graphical element 550a (and 550b in FIG. 5B) is a series of chevrons, in other examples the AR graphical element 550a (and 550b) may be different. The AR graphical element 550a (and 550b) may be partially transparent, or may be animated such that the AR graphical element 550a (and 550b) appears differently in other image frames of the video.

The AR graphical element 550a has a distance coordinate that is greater than a distance from the camera that captured the image frame 510a at the time of capture to the object 520. However, since the AR graphical element 550a is displayed without occlusion in the example of FIG. 5A, the AR graphical element 550a appears in front of the object 520 and partially covers the object 520, despite having a depth coordinate that corresponds to a location in the scene behind the object 520. This may cause confusion to a user since, logically, a user would expect the AR graphical element 550a to appear behind the object 520 in order to properly convey the distance to the AR graphical element 550a. In the example of turn-by-turn navigation, a user may erroneously be led to turn left on street 540 instead of street 530.

Figure 5B:
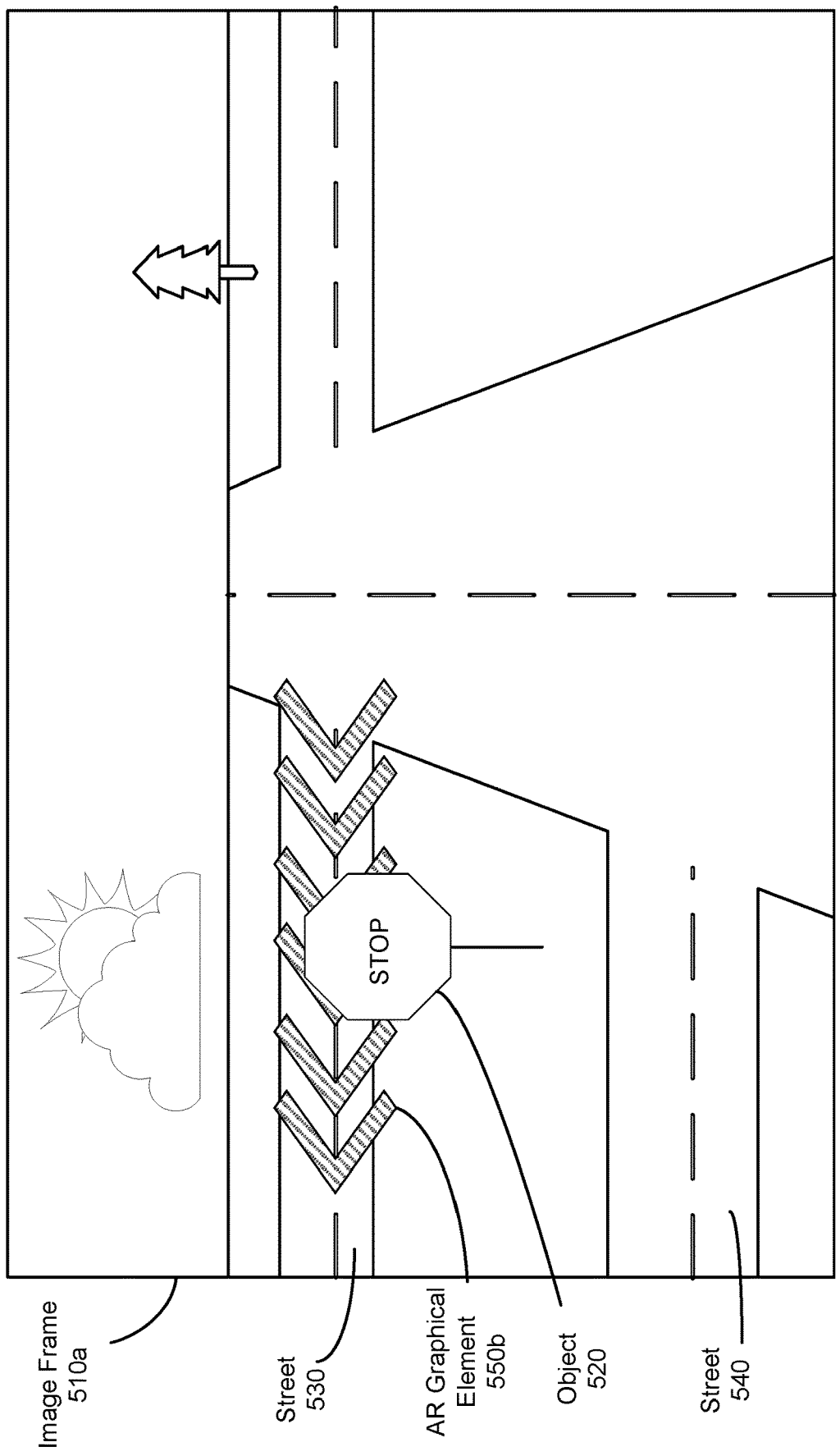
FIG. 5B illustrates an example of a scene depicted in an image frame of a video and a corresponding augmented reality (AR) graphical element overlaid on the scene with occlusion, in accordance with some embodiments.

FIG. 5B illustrates the same scene as that of FIG. 5A, but with the augmented reality (AR) graphical element overlaid on the scene with occlusion (rather than without occlusion, as in FIG. 5A), in accordance with some embodiments. The example of FIG. 5B includes an image frame 510b of video depicting the same scene (including object 520, street 530, and street 540) described above with regard to FIG. 5A. The image frame 510b may be an image frame capturing the field of view of the camera 147 integrated with the mobile computing device 145, as depicted in FIG. 4, according to some embodiments. In this example, the image frame 510a is part of an AR video displayed to a user for turn-by-turn navigation, as with the example of FIG. 5A.

The example of FIG. 5B includes an AR graphical element 550b that has the same distance coordinate as the AR graphical element 550a in FIG. 5A, which is greater than a distance from the camera 147 to the object 520. The AR engine 330 displays the AR graphical element 550b overlaid on the scene, such that the AR graphical element 550b appears behind the object 520. The video engine 310 provides the image frame 510b to the occlusion engine 340, and the AR engine 330 provides the AR position, including the distance coordinate, of AR graphical element 550b to the occlusion engine. The occlusion engine 340 also receives a depth map for the image frame 510b and determines an associated distance for each pixel in the image frame 510b. The AR engine 330 displays pixels in the image frame that have an associated distance less than the distance coordinate of the AR graphical element 550b instead of displaying corresponding pixels of the AR graphical element 550b, such that the AR graphical element 550 is at least partially occluded by one or more pixels of the image frame 510b. In the example shown in FIG. 5B, the pixels occluding the AR graphical element 550b correspond to the object 520b. In the example of FIG. 5B the distance coordinate of AR graphical element 550b is also less than a distance from the camera 147 to the street 530. Thus, as is shown in FIG. 5B, the AR graphical element 550b is not occluded by pixels in the image frame 510b associated with the street 530, and the AR graphical element 550b appears behind the object 520 but in front of the street 530.

Figure 6C:
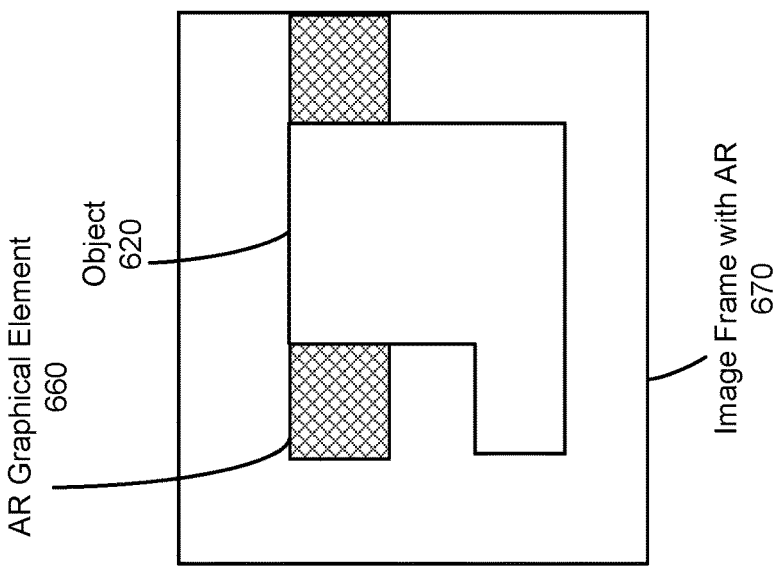
FIGS. 6A-6C illustrate the use of a depth map to display an AR graphical element overlaid on a scene of an image frame with occlusion, in accordance with some embodiments.
Figure 6B:
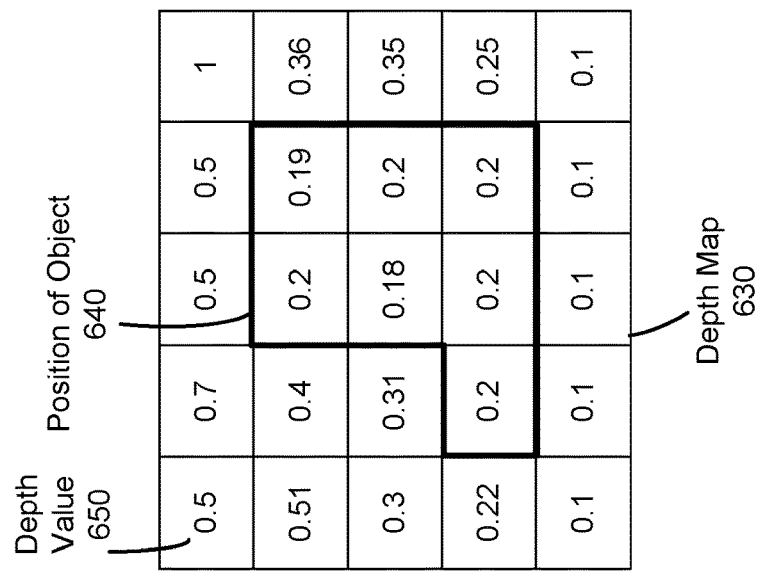
Figure 6A:
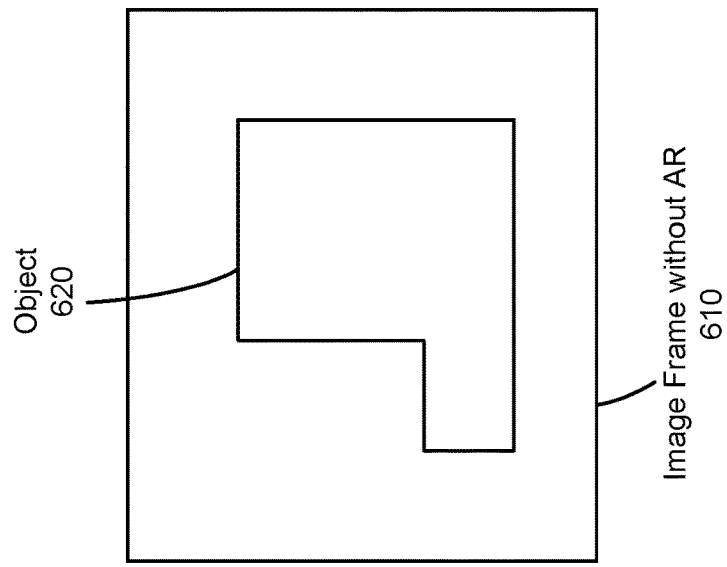

FIGS. 6A-6C illustrate the use of a depth map to display an AR graphical element overlaid on a scene of an image frame 610 with occlusion, in accordance with some embodiments. The AR graphical elements and image frame 610 can be displayed using any relevant rendering techniques and element geometry, textures, lighting, and shading. Example rendering techniques include, rasterization, ray casting, and ray tracing.

FIG. 6A illustrates a simplified example of an image frame 610 depicting a scene including object 620. The image frame 610 is a square image that includes 25 pixels.

FIG. 6B illustrates a depth map 630 corresponding to the image frame 610. The video engine 310 inputs the image frame 610 to the trained depth estimation model 114, which generates the depth map 630. An outline 640 of a portion of the depth map corresponding to the position of the object 620 is shown in FIG. 6B. The depth map 630 includes a depth value for each pixel of the image frame 610. For example, the top-left most pixel of the image frame has a depth value 650 of 0.5. Each depth value is in units of normalized depth, according to some embodiments.

FIG. 6C illustrates an image frame 670 of an AR video generated by the AR engine 330, including an AR graphical element 660 occluded by pixels of the image frame 610. The occlusion engine 340 receives the depth map 630 and the AR position of the AR graphical element 660. In this example, the AR graphical element has a distance coordinate that corresponds to a depth value of 0.21, according to the conversion factor determined by the occlusion engine 340, as described above with regard to FIG. 3. Therefore, each pixel of the image frame 610 with a depth value less than 0.21 that has the same horizontal and vertical position as a pixel of the AR graphical element 660 is displayed instead of the corresponding pixel of the AR graphical element. Thus, the AR graphical element 660 is occluded at positions on the image frame 670 that correspond to pixels with a depth value less than 0.21.

In this example, the pixels occluding the AR graphical element 660 correspond to the object 620, but in other embodiments, pixels not associated with the object 620 may occlude the AR graphical element 660. In some embodiments, not every pixel associated with the object 620 may occlude the AR graphical element 660. In further embodiments, the occlusion engine 340 determines whether or not to occlude a pixel of the AR graphical element 660 with a pixel of the image frame 610 further based on additional data. For example, the occlusion engine 340 may receive segmentation data from a trained segmentation model that influences the display of the AR graphical element 660, as described in further detail below with regard to FIG. 8. In some embodiments, rather than completely occluding a pixel of the AR graphical element 660 that has a depth value greater than the corresponding pixel of the image frame 670, the occlusion engine 340 instead blends the two pixels, e.g., based on a desired opacity value of the AR graphical element.

Figure 7:
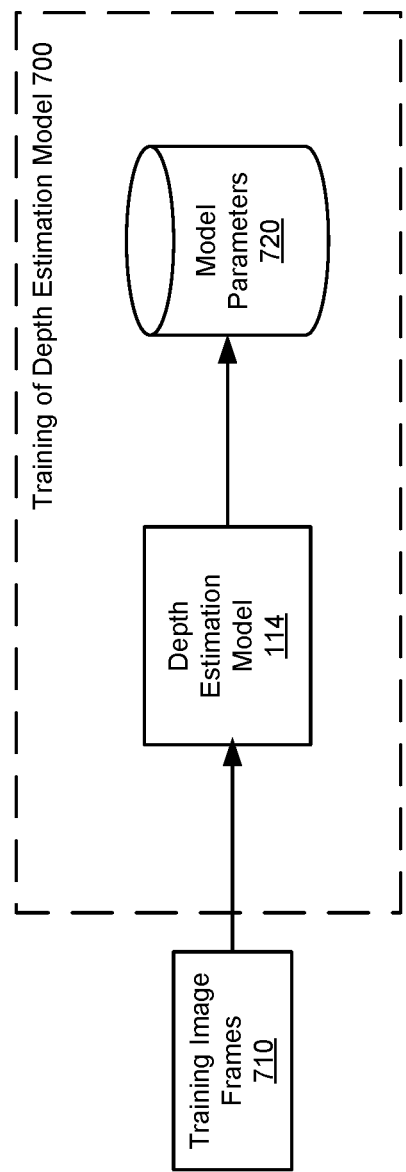
FIG. 7 is a block diagram illustrating a training of a depth estimation model used to generate a depth map for an image frame of a video, in accordance with some embodiments.

FIG. 7 is a block diagram illustrating a training 700 of a depth estimation model 114 to generate a depth map for an image frame of a video, in accordance with some embodiments. The model parameters 720 are used by the depth estimation model 114 to map an image frame to a corresponding depth map. During the training 700, the model parameters 720 are learned so as to provide the best mapping from the training image frames 710 to corresponding depth maps. The training image frames 710 may be received from client devices (e.g., mobile computing device 145) or from other systems over the network 165. The training image frames 710 may be included in one or more training videos. Once the model parameters 720 have been determined during the training 700, the trained depth estimation model 114 may be used to generate depth maps for image frames using the determined model parameters 720. As discussed with respect to FIGS. 6A-6C, the generated depth maps are used by the occlusion engine 340 to determine how to occlude AR graphical elements with elements in a scene depicted in an image frame of a video.

In some embodiments, the depth estimation model 114 is trained using a supervised learning technique. In this case, the training image frames 710 may be labeled with ground-truth training depth maps (not shown). For example, the ground-truth depth maps for each of the training image frames 710 may have been determined using a Light Detection and Ranging (LIDAR) system. Using the training image frames 710 and training depth maps, the model parameters 720 for the depth estimation model 114 may be learned using supervised neural networks (e.g., convolutional neural networks), support vector machines, linear regression, logistic regression, decision trees, and any other supervised learning technique usable to train a model to predict depth values given pixel data. In some embodiments, the model parameters may be received by the AR application 110 pre-trained. For example, another remote system may pre-train a local depth estimation model 114 using a set of training image frames and provide the pre-trained local depth estimation model 114 to the AR application 110 with learned model parameters 720. The AR reality application 110 may perform further training of the pre-trained depth estimation model 114.

In the same or different embodiments, the depth estimation model 114 is trained using a self-supervised training method. In this case, the training image frames 710 may be unlabeled, such that no ground-truth depth information available. Using the training image frames 710 and training depth maps, the model parameters 720 for the depth estimation model 114 may be learned using unsupervised neural networks (e.g., autoencoders, adversarial networks, etc.), k-means clustering, principal component analysis, and any other unsupervised learning technique usable to train a model to predict depth values given pixel data. In some embodiments, the training image frames 710 include image frames captured by multiple video capture devices. For example, a stereo camera system including two video capture devices may be used to capture the training image frames 710, and stereo vision supervised (e.g., self-supervised) methods may be used to train the depth estimation model 114. In other embodiments, the training image frames include images captured by a single video capture device, and the depth estimation model is trained using self-supervised monocular vision (i.e., the training 700 uses a monocular depth mapping system).

In the same or different embodiments, the depth estimation model 114 generates a depth map for an image from a video using other computer vision techniques for estimating the depth of objects in an image. These other computer vision techniques may use image frames received from one or more cameras (e.g., monocular or stereo methods), and may be used in combination with the supervised or supervised techniques described above. These techniques may include, but are not limited to, semi-global matching, structure from motion, simultaneous localization and mapping (SLAM), and any combination thereof.

In some embodiments, the trained depth estimation model 114 is used in combination with a LIDAR system. For example, the client map application 155 may compare depth information received from a LIDAR system with a depth map determined using the depth estimation model 114. In this case, the client map application 155 may adjust the depth estimation model 114 (e.g., tune parameters) and/or adjust the depth map.

Segmentation of Image Frames

Figure 8:
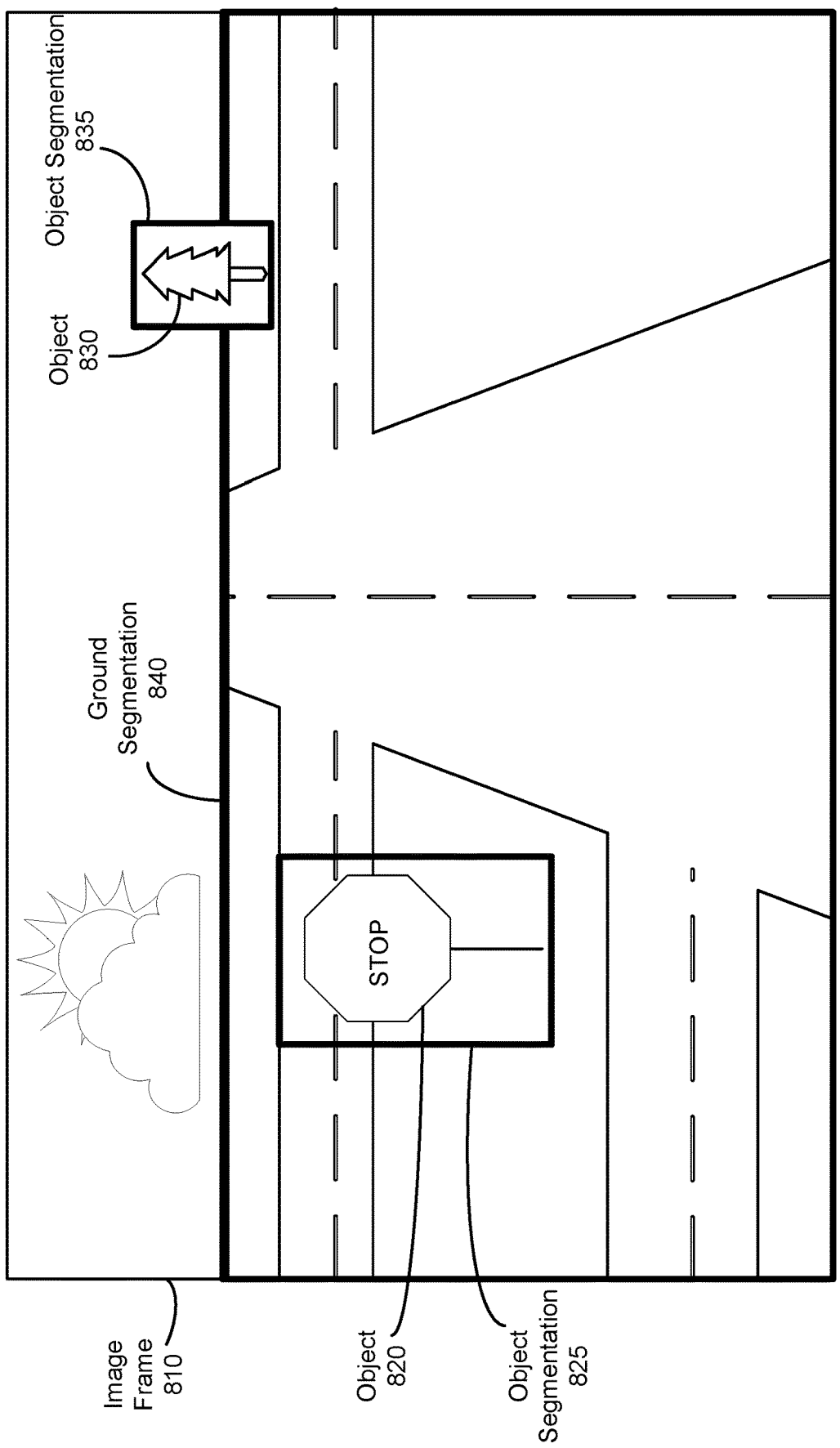
FIG. 8 illustrates segmentation of a scene depicted in an image frame of a video, in accordance with some embodiments.

FIG. 8 illustrates an example of segmentation of a scene depicted in an image frame of a video, in accordance with some embodiments. The image frame 810 depicts a scene including an object 820 and an object 830. In the example, the object 820 is a stop sign, and the object 830 is a tree. A trained segmentation model may generate the segmentations which identify portions of the image frame 810 that correspond to the segmentations, according to some embodiments. In the example of FIG. 8, the image frame 810 has been segmented into object segmentation 825 corresponding to object 820, object segmentation 835 corresponding to 840, and ground segmentation 840 corresponding to a ground surface in the scene.

According to some embodiments, the segmentations may be used to perform processing on depth maps generated by the trained depth model 114. The processing may include smoothing portions of the depth model to remove aberrant spikes in the depth map, correcting depth values that conflict with information provided by the trained segmentation model, or some other processing of the depth map. For example, the occlusion engine 340 may receive ground plane elevation data from the map engine 320 for the geographic area associated with the ground surface depicted in the scene of the image frame 810. Based on the received ground plane elevation data, the occlusion engine 340 may compare the depth values of the corresponding depth map for portions of the image frame 810 included in the ground segmentation 840. The occlusion engine 340 may smooth the depth map in the portions corresponding to the ground segmentation 840 in order to correct depth values in the depth map that may result in undesired behavior when displaying AR graphical elements with occlusion, according to some embodiments. For example, undesired behavior may occur as a result of features in the ground surface such as pot holes in a road or bumps on the ground surface. Without smoothing of these features in the depth map, AR graphical elements may be occluded by portions of the image frame 810 that are inconsistent with the desired display of the AR graphical elements.

According to some embodiments, the segmentation may also be used to identify reference pixels and determine reference distances for converting the depth values to distance values, as described above with regard to FIG. 3. For example, the ground segmentation 840 may be used to identify pixels in an image frame corresponding to the ground plane. In this case, the occlusion engine 340 may use the pixels corresponding the ground plane to determine parameters representing the ground plane in three-dimensional space (e.g., three non-collinear points on the ground plane, two parallel lines on the ground plane, etc.). Techniques for determining parameters representing the ground plane include projecting the pixels in the frame representing the ground plane on a plane in three-dimensional space based on the depth map (e.g., using intrinsic parameters of the camera 147 and the depth value for a pixel in the depth map). The three-dimensional coordinates of the pixels representing the ground plane can then be used to determine the parameters representing the ground plane, such as by assuming the three-dimensional coordinates are in the same plane and solving a system of linear equations for the parameters of the ground plane. Once the occlusion engine 340 has determined parameters representing the ground plane, the occlusion engine 340 may determine the distance from the camera to any point on the ground plane corresponding to a pixel using the known height of the camera relative to the ground., The occlusion engine 340 may then use any of the pixels corresponding to the ground plane as a reference pixel.

In further embodiments, the object segmentation 825 and the object segmentation 835 are used to identify reference pixels. In this case, the geographic location of the object 820 and the object 830 are stored in the mapping data 360. The reference distance for the respective reference pixels may then be calculated based on the geographic location of the respective object and the geographic location of the camera 147. The geographic locations of the object 820 and the object 830 may be determined using the methods in U.S. patent application Ser. No. 16/564,701 cited above in reference to FIG. 3. In other embodiments, other methods of determining the geographic location of the object 820 and the object 830 may be used.

Figure 9:
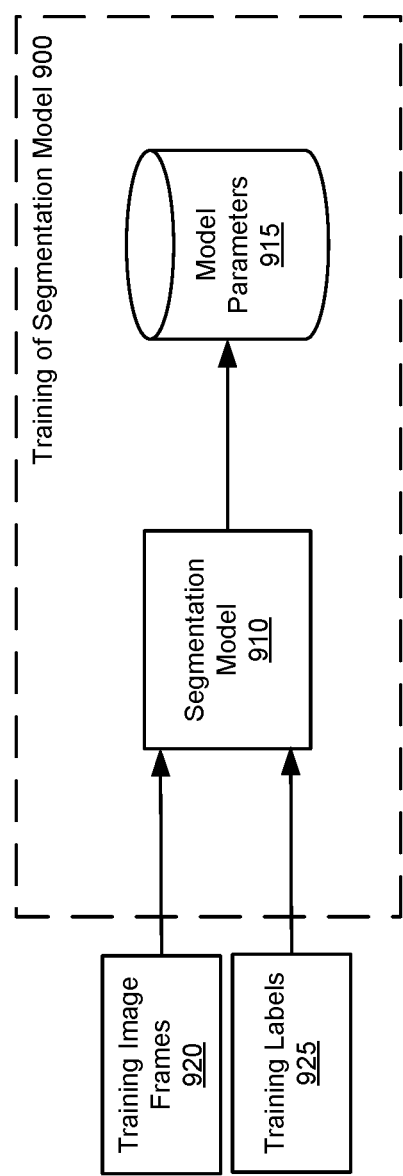
FIG. 9 is a block diagram illustrating a training of a segmentation model used to extract elements of a scene from an image frame of a video, in accordance with some embodiments.

FIG. 9 is a block diagram illustrating a training of a segmentation model used to extract elements of a scene from an image frame of a video, in accordance with some embodiments. In the training of the segmentation model 900, the segmentation model 910 is trained using training image frames 920 and associated training labels 925 for each of the training image frames. The training labels 925 may include a type of element corresponding to the elements, and an orientation of the elements in their respective image frames. In other embodiments, other training labels may be received by the segmentation model 910.

The segmentation model 910 is trained by determining model parameters 915, so as to best represent the relationship between the training image frames 920 and the associated training labels 925. In some embodiments, the segmentation model 910 is trained using one or more of the supervised and/or unsupervised learning techniques discussed above in relation to depth estimation model 114. Once the model parameters 915 are known, the trained segmentation model 910 may be used to segment elements in image frames and output the orientation of the elements in their respective image frames by accessing the determined model parameters. In other embodiments, the trained segmentation model 910 may output other labels and data associated with segmented elements. As discussed with respect to FIG. 8, the output of the trained segmentation model 910 is used to segment image frames of the video captured by the camera 147.

Process for Displaying AR Graphical Elements with Occlusion

Figure 10:
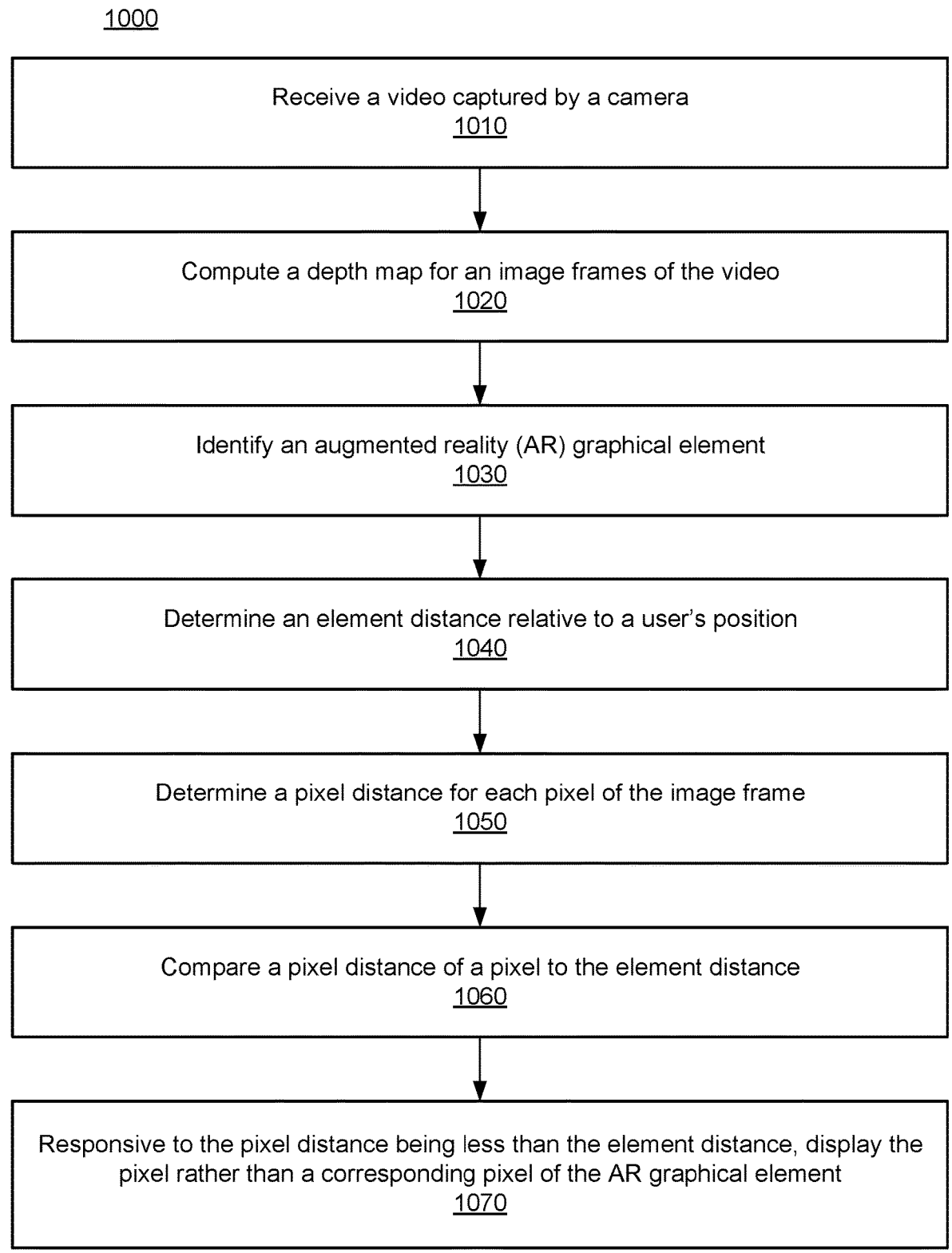
FIG. 10 is a flow chart for a method of displaying a graphical AR element overlaid on a scene of an image frame with occlusion, in accordance with some embodiments.

FIG. 10 is a flow chart for a method of displaying a graphical AR element overlaid on a scene of an image frame with occlusion, in accordance with some embodiments. The method 1000 is executed by the AR display module 159, according to some embodiments. The AR display module 159 receives 1010 a video captured by a camera. The camera may be associated with a mobile computing device. In further embodiments, the mobile computing device is part of a mapping system or provides a mapping service. The AR display module 159 computes 1010 a depth map for an image frame of the video using the trained depth estimation model 114. The depth map includes a depth value for each pixel of each image frame, and each depth value indicates a relative depth of an element in a scene of the image frame that is represented by the pixel.

The AR display module 159 then receives 1030 an AR graphical element for displaying overlaid on the image frame. The AR display module 159 also receives 1040 an element distance for the AR graphical element, which indicates the distance of the AR graphical element relative to the camera (or user). The AR display module 159 then determines 1050 a pixel distance for each pixel of the image frame based on the computed depth map. In further embodiments, the AR display module 159 identifies a reference pixel on the image frame and determines a reference distance indicating a distance from the camera (or user) to an element in the scene represented by the reference pixel in order to determine 1050 the pixel distance.

The AR display module 159 compares 1060 the pixel distance of a pixel on the image frame to the element distance. The pixel is positioned in the image frame at the same position that the AR graphical element will be displayed. Responsive to the pixel distance being less than the element distance, the AR display module 159 displays the pixel rather than a corresponding pixel of the AR graphical element.

According to some embodiments, the method 1000 may include different steps than shown in FIG. 10.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method comprising:
   receiving a video comprising image frames;
   computing a depth map for an image frame of the video, the depth map including a depth value for pixels in the image frame;
   identifying an augmented reality (AR) graphical element for overlaying on the video;
   determining an element distance of the AR graphical element relative to a position of a video capture device that captured the video;
   determining a pixel distance for each pixel in the image frame based on the depth map corresponding to the image frame, the determining the pixel distance for each pixel in the image frame comprising:
      determining a reference distance from the video capture device to a portion of a reference element represented by a reference pixel in the image frame;
      calculating a conversion factor for the depth map based on the determined reference distance and a reference depth value of the depth map corresponding to the reference pixel; and calculating the pixel distances of the pixels in the image frame based on a depth value of the pixel in the image frame and the conversion factor;
comparing a pixel distance of a particular pixel of the image frame of the video to the element distance; and
responsive to the pixel distance of the particular pixel of the image frame being less than the element distance, displaying the particular pixel of the image frame rather than a corresponding pixel of the AR graphical element, such that the AR graphical element is at least partially occluded by one or more pixels of the image frame.

2. The computer-implemented method of claim 1, wherein computing the depth map for the image frame comprises inputting the image frame to a trained depth estimation model to generate the depth map, and wherein the depth value for each pixel in the image frame is a relative depth value.

3. The computer-implemented method of claim 2, wherein training the trained depth estimation model comprises:
receiving a set of training image frames of one or more training videos; and
determining a set of model parameters mapping the set of training image frames to corresponding depth maps.

4. The computer-implemented method of claim 2, wherein the trained depth estimation model is a self-supervised monocular depth estimation model.

5. The computer-implemented method of claim 1, wherein the determining the reference distance for each image frame is based on a calibration for the image frame, the calibration based on a geographic location of the video capture device and an angular orientation of the video capture device relative to a ground plane corresponding to the geographic location during capture of the image frame.

6. The computer-implemented method of claim 1, wherein the determining the reference distance for each image frame comprises:
detecting an object or landmark captured in the image frame represented by the reference pixel; and
calculating the reference distance based on a geographic location of the object or landmark and a geographic location of the video capture device during capture of the image frame.

7. The computer-implemented method of claim 6, wherein detecting the object or landmark comprises dynamic object detection of a moving object.

8. The computer-implemented method of claim 1, wherein computing the depth map for the image frame is based on a depth map generated by one of a stereo camera system, a system using more than one camera, a light detection and ranging (LIDAR) system, and a monocular depth mapping system using a single camera.

9. The computer-implemented method of claim 1, wherein determining the pixel distance further comprises:
segmenting portions of the image frame;
smoothing the depth map corresponding to the image frame based on the segmented portions of the image frame; and
determining the pixel distance based on the smoothed depth map.

10. The computer-implemented method of claim 9, wherein the pixel distance is further determined based on the segmented portions of the image frame.

11. The computer-implemented method of claim 9, wherein segmenting portions of the image frame comprises inputting the image frame to an image segmentation model to generate one or more output groups of pixels and at least one output label for each of the one or more groups of pixels.

12. The computer-implemented method of claim 1, wherein the video is displayed with the AR graphical element overlaid on portions of the video on a display of a navigation system.

13. The computer-implemented method of claim 12, wherein the display of the navigation system comprises a display of a mobile computing device.

14. A non-transitory computer readable storage medium storing executable instructions that, when executed by one or more processors, cause the one or more processors to perform steps comprising:
receiving a video comprising image frames;
computing a depth map for an image frame of the video, the depth map including a depth value for each pixel in the image frame;
identifying an augmented reality (AR) graphical element for overlaying on the video;
determining an element distance of the AR graphical element relative to a position of a video capture device that captured the video;
determining a pixel distance for each pixel in the image frame based on the depth map corresponding to the image frame, the determining the pixel distance for each pixel in the image frame comprising:
determining a reference distance from the video capture device to a portion of a reference element represented by a reference pixel in the image frame;
calculating a conversion factor for the depth map based on the determined reference distance and a reference depth value of the depth map corresponding to the reference pixel; and
calculating the pixel distances of the pixels in the image frame based on a depth value of the pixel in the image frame and the conversion factor;
comparing a pixel distance of a particular pixel of the image frame of the video to the element distance; and
responsive to the pixel distance of the particular pixel of the image frame being less than the element distance, displaying the particular pixel of the image frame rather than a corresponding pixel of the AR graphical element, such that the AR graphical element is at least partially occluded by one or more pixels of the image frame.

15. The computer-readable storage medium of claim 14, wherein computing the depth map for the image frame comprises inputting the image frame to a trained depth estimation model to generate the depth map, and the depth value for each pixel in the image frame is a relative depth value.

16. The computer-readable storage medium of claim 14, wherein the trained depth estimation model is a self-supervised monocular depth estimation model.

17. The computer-readable storage medium of claim 1, wherein the determining the reference distance for each image frame is based on a calibration for the image frame, the calibration based on a geographic location of the video capture device and an angular orientation of the video capture device relative to a ground plane corresponding to the geographic location during capture of the image frame.

18. The computer-readable storage medium of claim 1, wherein the determining the reference distance for each image frame comprises:
detecting an object or landmark captured in the image frame represented by the reference pixel; and calculating the reference distance based on a geographic location of the object or landmark and a geographic location of the video capture device during capture of the image frame.

19. The computer-readable storage medium of claim 14, wherein determining the pixel distance further comprises:
   segmenting portions of the image frame;
   smoothing the depth map corresponding to the image frame based on the segmented portions of the image frame; and
   determining the pixel distance based on the smoothed depth map.

20. The computer-readable storage medium of claim 19, wherein the pixel distance is further determined based on the segmented portions of the image frame.

* * * * *